United States Patent
Zhang et al.

(10) Patent No.: US 11,463,666 B2
(45) Date of Patent: Oct. 4, 2022

(54) METHOD AND APPARATUS FOR ANALYZING AN IMAGING QUALITY OF AN IMAGING SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shuo Zhang, Beijing (CN); Hao Zhang, Beijing (CN); Lili Chen, Beijing (CN); Hongzhen Xue, Beijing (CN); Minglei Chu, Beijing (CN); Guixin Yan, Beijing (CN); Yukun Sun, Beijing (CN); Chenxi Zhao, Beijing (CN); Zehua Dong, Beijing (CN); Xiangjun Peng, Beijing (CN); Yaoyu Lv, Beijing (CN); Yachong Xue, Beijing (CN); Huidong He, Beijing (CN); Qingwen Fan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 131 days.

(21) Appl. No.: 16/862,877

(22) Filed: Apr. 30, 2020

(65) Prior Publication Data
US 2021/0092339 A1    Mar. 25, 2021

(30) Foreign Application Priority Data
Sep. 19, 2019    (CN) .......................... 201910887931.0

(51) Int. Cl.
*G03H 1/08* (2006.01)
*H04N 9/31* (2006.01)
(Continued)

(52) U.S. Cl.
CPC .............. *H04N 9/3191* (2013.01); *G03H 1/10* (2013.01); *G03H 1/268* (2013.01); *H04N 9/3105* (2013.01)

(58) Field of Classification Search
CPC ............ G03H 1/10; G03H 1/268; G03H 1/00; G03H 1/0443; G03H 2001/045;
(Continued)

(56) References Cited

U.S. PATENT DOCUMENTS

| | | | |
|---|---|---|---|
| 2003/0215724 A1 | 11/2003 | Asano et al. | |
| 2004/0114111 A1* | 6/2004 | Watanabe | G02B 27/1046 353/31 |
| 2016/0004134 A1 | 1/2016 | Zhang et al. | |
| 2016/0377846 A1 | 12/2016 | Lai et al. | |
| 2019/0198543 A1 | 6/2019 | Guo et al. | |

FOREIGN PATENT DOCUMENTS

| | | |
|---|---|---|
| CN | 1808270 A | 7/2006 |
| CN | 102706218 A | 10/2012 |

(Continued)

OTHER PUBLICATIONS

Office Action issued for Chinese Application No. 201910887931.0 dated Aug. 24, 2021, 20 pages.
(Continued)

*Primary Examiner* — Arnel C Lavarias
(74) *Attorney, Agent, or Firm* — Dave Law Group LLC; Raj S. Dave (57) ABSTRACT

Embodiments of the present disclosure relate to a method for analyzing an imaging quality of an imaging system. The imaging system comprises a spatial light modulator. The spatial light modulator comprises pixel units arranged in an array. The method comprises obtaining a transmittance
(Continued)

distribution function of the spatial light modulator based on a structural parameter of the pixel unit, wherein the structural parameter is an aperture ratio. The imaging quality analysis parameter of the imaging system is obtained based on the transmittance distribution function of the spatial light modulator. Then, the imaging quality of the imaging system is analyzed based on the imaging quality analysis parameter.

18 Claims, 7 Drawing Sheets

(51) Int. Cl.
*G03H 1/10* (2006.01)
*G03H 1/26* (2006.01)

(58) Field of Classification Search
CPC ...... G03H 1/08; G03H 1/0808; G03H 1/0841; G03H 1/0866; G03H 2001/0875; G03H 2225/00; G03H 2225/30; G03H 2225/32; G03H 2225/33; H04N 9/3105
USPC ................................ 359/9, 1, 29, 32, 33, 35
See application file for complete search history.

(56) References Cited

FOREIGN PATENT DOCUMENTS

| | | | |
|---|---|---|---|
| CN | 103235455 | A | 8/2013 |
| CN | 103308282 | A | 9/2013 |
| CN | 103777395 | A | 5/2014 |
| CN | 105574293 | A | 5/2016 |
| CN | 107248518 | A | 10/2017 |
| CN | 107302667 | A | 10/2017 |
| CN | 109814360 | A | 5/2019 |
| CN | 110191335 | A | 8/2019 |

OTHER PUBLICATIONS

W. Kaminsky et al., "Simultaneous false-colour imaging of birefringence, extinction and transmittance at camera speed", Journal of Microscopy, vol. 228, Pt 2 2007, pp. 153-164.

Wang Yali, "Detection and quality analysis of light cone transmittance", 8 pages.

Zhu Wufeng, "Research on the characteristics of incoherent digital holographic imaging based on spatial light modulator", 60 pages.

* cited by examiner

Obtaining, when spatial light modulator is in non-modulated state, transmittance distribution function of spatial light modulator in spatial domain based on aperture side length of pixel unit ~910

Obtaining, when spatial light modulator is in modulated state, transmittance distribution function of spatial light modulator in spatial domain based on aperture side length of pixel unit ~920

Obtaining transmittance distribution function of spatial light modulator in frequency domain based on transmittance distribution function of spatial light modulator in spatial domain — 1310

Obtaining light intensity distribution function on imaging device based on transmittance distribution function of spatial light modulator in frequency domain — 1320

Obtaining diffraction efficiency of spatial light modulator based on light intensity distribution function on imaging device — 1330

Obtaining first light intensity and second light intensity based on light intensity distribution function on imaging device ⎯ 1610

Determining ratio of second light intensity to first light intensity as diffraction efficiency of spatial light modulator ⎯ 1620

METHOD AND APPARATUS FOR ANALYZING AN IMAGING QUALITY OF AN IMAGING SYSTEM

CROSS-REFERENCE TO RELATED APPLICATIONS

The present application claims the benefit and priority of Chinese patent application No. 201910887931.0 filed on Sep. 19, 2019, the disclosure of which is hereby incorporated by reference in its entirety as a part of the present application.

TECHNICAL FIELD

The present disclosure relates to the field of optical technology, and particularly, relates to a method and apparatus for analyzing an imaging quality of an imaging system.

BACKGROUND

Currently, with the continuous development of display technology, holographic projection display technology has gradually become one of the research hotspots in the field of three-dimensional display at home and abroad.

SUMMARY

The present disclosure provides a method for analyzing an imaging quality of an imaging system and an apparatus for analyzing an imaging quality of an imaging system.

A first aspect of the present disclosure provides a method for analyzing an imaging quality of an imaging system. The imaging system comprises a spatial light modulator comprising pixel units arranged in an array. The method comprises: obtaining a transmittance distribution function of the spatial light modulator based on a structural parameter, which is an aperture ratio of the pixel unit; obtaining an imaging quality analysis parameter of the imaging system based on the transmittance distribution function of the spatial light modulator; and analyzing the imaging quality of the imaging system based on the imaging quality analysis parameter.

In an embodiment of the present disclosure, the imaging quality analysis parameter may comprise a diffraction efficiency of the spatial light modulator.

In an embodiment of the present disclosure, obtaining the transmittance distribution function of the spatial light modulator based on the structural parameter of the pixel unit may comprise: obtaining an aperture side length of the pixel unit based on the aperture ratio of the pixel unit; and obtaining the transmittance distribution function of the spatial light modulator in a spatial domain based on the aperture side length of the pixel unit.

In an embodiment of the present disclosure, based on the aperture ratio of the pixel unit, the aperture side length of the pixel unit may be obtained via a formula as below:

$$K = \left(\frac{\Delta x'}{\Delta x}\right)^2$$

where K is the aperture ratio of the pixel unit, $\Delta x$ is a side length of the pixel unit, and $\Delta x'$ is the aperture side length of the pixel unit.

In an embodiment of the present disclosure, the spatial light modulator may have a non-modulated state and a modulated state. When the spatial light modulator may be in the non-modulated state, based on the aperture side length of the pixel unit, the transmittance distribution function of the spatial light modulator in the spatial domain may be obtained via a formula as below:

$$t(x, y) = \left[comb\left(\frac{x}{\Delta x}\right)comb\left(\frac{y}{\Delta x}\right)\right] * \left[rect\left(\frac{x}{\Delta x'}\right)rect\left(\frac{y}{\Delta x'}\right)\right]$$

where t(x,y) is the transmittance distribution function, comb is a comb function, "comb" is a comb function, "rect" is a matrix function, "*" is a convolution operation, x is a coordinate in a first direction and y is a coordinate in a second direction perpendicular to the first direction; and When the spatial light modulator may be in the modulated state, based on the aperture side length of the pixel unit, the transmittance distribution function of the spatial light modulator in the spatial domain may be obtained via a formula as below:

$$t(x, y) = \left[\sum_{k=0}^{N-1} rect\left(\frac{x - k\Delta x}{\Delta x'}\right)\sum_{k=0}^{N-1} rect\left(\frac{y - k\Delta x}{\Delta x'}\right)\exp\left(i\frac{2\pi k}{N-1}\right)\right] * \left[comb\left(\frac{x}{N\Delta x'}\right)comb\left(\frac{y}{N\Delta x'}\right)\right]$$

where t(x,y) is the transmittance distribution function, "exp" is an exponential function, "comb" is a comb function, "rect" is a matrix function, "*" is a convolution operation, x is a coordinate in a first direction, y is a coordinate in a second direction perpendicular to the first direction, and N is a number of the pixel units required for phase wrapping.

In an embodiment of the present disclosure, the imaging system may further comprise an imaging device configured to image according to diffracted light of the spatial light modulator. Obtaining the imaging quality analysis parameter of the imaging system based on the transmittance distribution function of the spatial light modulator may comprise: obtaining the transmittance distribution function of the spatial light modulator in a frequency domain based on the transmittance distribution function of the spatial light modulator in the spatial domain; obtaining a light intensity distribution function on the imaging device based on the transmittance distribution function of the spatial light modulator in the frequency domain; and obtaining a diffraction efficiency of the spatial light modulator based on the light intensity distribution function on the imaging device.

In an embodiment of the present disclosure, obtaining the transmittance distribution function of the spatial light modulator in the frequency domain based on the transmittance distribution function of the spatial light modulator in the spatial domain may comprise: obtaining the transmittance distribution function of the spatial light modulator in the frequency domain by performing a Fourier transformation on the transmittance distribution function of the spatial light modulator in the spatial domain.

In an embodiment of the present disclosure, the imaging system may further comprise a light source device configured to emit laser towards the spatial light modulator. Based on the transmittance distribution function of the spatial light modulator in the frequency domain, the light intensity distribution function on the imaging device may be obtained via a formula as below:

$$I(x, y) = \left(\frac{A}{\lambda z}\right)^2 \left|T\left(\frac{x}{\lambda z}, \frac{y}{\lambda z}\right)\right|^2$$

where I(x,y) is a light intensity distribution function on the imaging device, A is an amplitude of the laser, λ, is a wavelength of the laser, x is a coordinate in a first direction, y is a coordinate in a second direction perpendicular to the first direction, z is a distance between the spatial light modulator and the imaging device, and $T(f_x, f_y)$ is the transmittance distribution function of the spatial light modulator in the frequency domain.

In an embodiment of the present disclosure, the spatial light modulator may have a non-modulated state and a modulated state. Obtaining a diffraction efficiency of the spatial light modulator based on the light intensity distribution function on the imaging device may comprise: obtaining a first light intensity and a second light intensity based on the light intensity distribution function on the imaging device, wherein the first light intensity may be a sum of light intensities at every positions of the imaging device when the spatial light modulator is in the non-modulated state, and the second light intensity may be a light intensity of the diffracted light at a desired level on the imaging device when the spatial light modulator is in the modulated state; and determining an ratio of the second light intensity to the first light intensity as the diffraction efficiency of the spatial light modulator.

A second aspect of the present disclosure provides an apparatus for analyzing an imaging quality of an imaging system. The imaging system comprises a spatial light modulator comprising pixel units arranged in an array. The apparatus comprises: an transmittance distribution obtaining module, configured to obtain a transmittance distribution function of the spatial light modulator based on a structural parameter, which is an aperture ratio, of the pixel unit; a parameter obtaining module, configured to obtain an imaging quality analysis parameter of the imaging system based on the transmittance distribution function of the spatial light modulator; and an analysis module, configured to analyze the imaging quality of the imaging system based on the imaging quality analysis parameter.

In an embodiment of the present disclosure, the transmittance distribution obtaining module may be further configured to obtain the transmittance distribution function of the spatial light modulator based on the structural parameter of the pixel unit by: obtaining an aperture side length of the pixel unit based on the aperture ratio of the pixel unit; and obtaining the transmittance distribution function of the spatial light modulator in a spatial domain based on the aperture side length of the pixel unit.

In an embodiment of the present disclosure, the transmittance distribution obtaining module may be further configured to obtain the aperture side length of the pixel unit based on the aperture ratio of the pixel unit and the side length of the pixel unit via a formula as below:

$$K = \left(\frac{\Delta x'}{\Delta x}\right)^2$$

where K is the aperture ratio of the pixel unit, Δx is a side length of the pixel unit, and Δx' is the aperture side length of the pixel unit.

In an embodiment of the present disclosure, the spatial light modulator may have a non-modulated state and a modulated state. When the spatial light modulator is in the non-modulated state, the transmittance distribution obtaining module may be further configured to obtain the transmittance distribution function of the spatial light modulator in the spatial domain based on the aperture side length of the pixel unit via a formula as below:

$$t(x, y) = \left[comb\left(\frac{x}{\Delta x}\right)comb\left(\frac{y}{\Delta x}\right)\right] * \left[rect\left(\frac{x}{\Delta x'}\right)rect\left(\frac{y}{\Delta x'}\right)\right]$$

where t(x,y) is the transmittance distribution function, "comb" is a comb function, "rect" is a matrix function, "*" is a convolution operation, x is a coordinate in a first direction and y is a coordinate in a second direction perpendicular to the first direction.

When the spatial light modulator is in the modulated state, the transmittance distribution obtaining module may be further configured to obtain the transmittance distribution function of the spatial light modulator in the spatial domain based on the aperture side length of the pixel unit via a formula as below:

$$t(x, y) = \left[\sum_{k=0}^{N-1} rect\left(\frac{x - k\Delta x}{\Delta x'}\right)\sum_{k=0}^{N-1} rect\left(\frac{y - k\Delta x}{\Delta x'}\right) \exp\left(i\frac{2\pi k}{N-1}\right)\right] *$$

$$\left[comb\left(\frac{x}{N\Delta x'}\right)comb\left(\frac{y}{N\Delta x'}\right)\right]$$

where t(x,y) is the transmittance distribution function, "exp" is an exponential function, "comb" is a comb function, "rect" is a matrix function, "*" is a convolution operation, x is a coordinate in a first direction, y is a coordinate in a second direction perpendicular to the first direction, and N is a number of the pixel units required for phase wrapping.

In an embodiment of the present disclosure, the imaging system may further comprise an imaging device configured to image according to a diffracted light of the spatial light modulator. The parameter obtaining module may be further configured to obtain imaging quality analysis parameter of the imaging system based on the transmittance distribution function of the spatial light modulator by: obtaining the transmittance distribution function of the spatial light modulator in the frequency domain based on the transmittance distribution function of the spatial light modulator in the spatial domain; obtaining a light intensity distribution function on the imaging device according to the transmittance distribution function of the spatial light modulator in the frequency domain; and obtaining a diffraction efficiency of the spatial light modulator based on the light intensity distribution function on the imaging device.

In an embodiment of the present disclosure, the parameter obtaining module may be further configured to obtain the transmittance distribution function of the spatial light modulator in the frequency domain based on the transmittance distribution function of the spatial light modulator in the spatial domain by: obtaining the transmittance distribution function of the spatial light modulator in the frequency domain by performing a Fourier transformation on the transmittance distribution function of the spatial light modulator in the spatial domain.

In an embodiment of the present disclosure, the imaging system may further comprise a light source device configured to emit laser towards the spatial light modulator. The parameter obtaining module may be further configured to obtain a light intensity distribution function on the imaging device based on the transmittance distribution function of the spatial light modulator in the frequency domain via a formula as below:

$$I(x, y) = \left(\frac{A}{\lambda z}\right)^2 \left|T\left(\frac{x}{\lambda z}, \frac{y}{\lambda z}\right)\right|^2$$

where I(x,y) is a light intensity distribution function on the imaging device, A is an amplitude of the laser, $\lambda$ is a wavelength of the laser, x is a coordinate in a first direction, y is a coordinate in a second direction perpendicular to the first direction, z is a distance between the spatial light modulator and the imaging device, and $T(f_x, f_y)$ is the transmittance distribution function of the spatial light modulator in the frequency domain.

In an embodiment of the present disclosure, the spatial light modulator may have a non-modulated state and a modulated state. The parameter obtaining module may be further configured to obtain a diffraction efficiency of the spatial light modulator based on the light intensity distribution function on the imaging device by: obtaining a first light intensity and a second light intensity based on the light intensity distribution function on the imaging device, wherein the first light intensity is a sum of light intensities at every position of the imaging device when the spatial light modulator is in the non-modulated state, and the second light intensity is a light intensity of the diffracted light at a desired level on the imaging device when the spatial light modulator is in the modulated state; and determining an ratio of the second light intensity to the first light intensity as the diffraction efficiency of the spatial light modulator.

Other features and advantages of the present disclosure will be set forth in detail in the subsequent description, and partially become obvious from the description, or be understood by implementing the present disclosure. Other advantages of the present disclosure can be achieved and obtained by the solutions described in the description, claims, and drawings.

BRIEF DESCRIPTION OF THE DRAWINGS

The drawings are employed to provide understandings of technical solutions of the present disclosure, and form a part of the description. The drawings are employed to explain the technical solutions of the present disclosure together with the embodiments of the present disclosure. However, these do not intend to limit the technical solutions of the present disclosure, wherein throughout all the drawings as below, the same reference numeral indicates the same component or feature.

DETAILED DESCRIPTION

The present discloser describes a plurality of embodiments, but the description is exemplary and not restrictive. Furthermore, it is obvious to these ordinary skilled in the art that there can be more embodiments and implementation solutions within the scope of the embodiments described in the present disclosure. Although many possible combinations of features are shown in the drawings and discussed in the detailed description, many other combinations of the disclosed features are also possible. Unless being limited specifically, any feature or element in any embodiment may be used in combination with, or may replace another feature or element in another embodiment.

The present disclosure includes and contemplates the combinations of the features and elements known to those ordinary skilled, in the art. The embodiments, features, and elements disclosed in the present disclosure may also be combined with any conventional feature or element to form unique invention solution defined by the claims. Any feature or element in any embodiment may also be combined with a feature or element from another invention to form another unique invention solution defined by the claims. Therefore, it can be understood that any feature shown and/or discussed in the present disclosure may be implemented individually or in any suitable combination. Therefore, there are no limitations, except the limitations in accordance with the appended claims and equivalent substitutions thereof, on the embodiments. In addition, various modifications and changes can be made within the scope of the appended claims.

In addition, when the representative embodiments are descripted, the description may have presented the methods and/or processes in a specific sequence of steps. However, the methods or processes should not be limited to the described specific sequence of steps. As understood by those ordinary skilled in the art, other sequences of steps are also possible. Therefore, the specific sequence of steps set forth in the description should not be construed as limiting the claims. In addition, the claims for the methods and/or processes should not be limited to performing their steps in the descripted sequence, and those skilled in the art may easily understand that these sequences can be varied and still fall in the spirit and the scope of the embodiments of the present disclosure.

Unless otherwise defined, the technical terms or scientific terms disclosed and used in the embodiments of the present disclosure shall have the common meanings understood by persons with general skills in the field to which the present disclosure belongs. The words "first", "second" and the like used in the embodiments of the present disclosure do not represent any sequence, quantity or importance, but are only used to distinguish different components. Similar words such as "comprise" or "include" and the like mean that the elements or objects appearing ahead of the words cover the elements or objects listed follow the words and their equivalents, but do not exclude other elements or objects. "Connected" or "coupled" and the like are not limited to physical or mechanical connections, but may include electrical connections, whether direct or indirect. "up", "under", "right", "left" and the like are only used to indicate the relative position relationship, and when the absolute position of the described object changes, the relative position relationship may also change accordingly.

In the holographic projection display, a hologram is generated by a computer, and then loaded onto a spatial light modulator, which is illuminated with laser to form a diffracted image. The diffracted image can completely record and reconstruct a three-dimensional object and provide all the depth information required by the human visual system. A controlled unit of the spatial light modulator is an independent pixel unit, and each pixel unit can independently receive control signal such as optical signal or electrical signal.

During a holographic projection, when laser enters the spatial light modulator, a diffraction phenomenon occurs and the diffracted image is formed. In related art, by analyzing the imaging quality, problems that may occur during imaging are foreseen, so as to eliminate them during imaging. The inventors found that a method for analyzing a imaging quality in the related art does not take into consideration an influence of an aperture ratio of the pixel unit on the imaging quality. However, for some spatial light modulators, the influence of the aperture ratio of the pixel unit cannot be ignored. Therefore, when this method for analyzing the imaging quality in the related art is used to analyze this spatial light modulator, an analyzing accuracy is not high.

The present disclosure provides a method for analyzing the imaging quality of an imaging system. The method takes the influence of the aperture ratio on the imaging quality into consideration, thereby improving the analyzing accuracy of the imaging quality.

Figure 1:
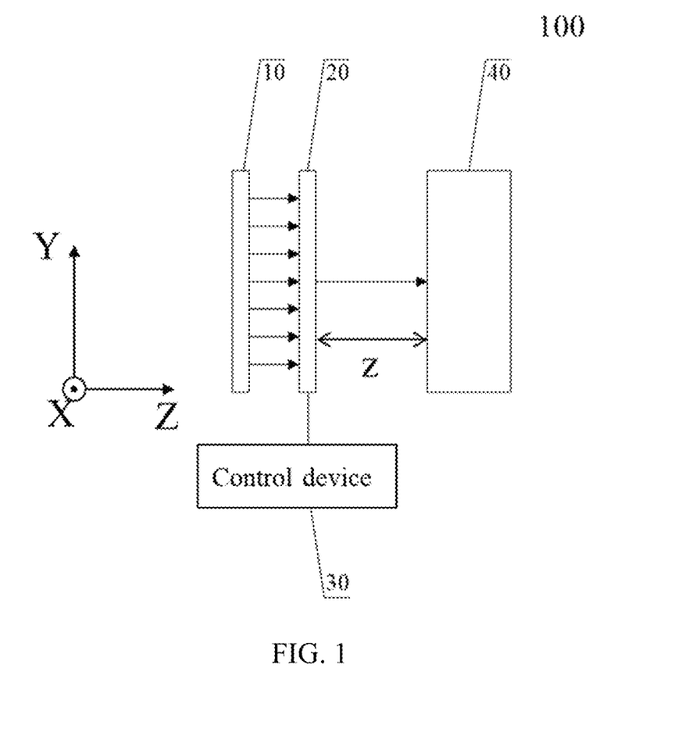
FIG. 1 shows a schematic diagram of an imaging system.

FIG. 1 shows a schematic structural diagram of an imaging system 100. As shown in FIG. 1, the imaging system 100 may comprise a light source device 10, a spatial light modulator 20, a control device 30, and an imaging device 40. In the embodiments of the present disclosure, the exit surface of the spatial light modulator 20 from which light exits may be opposite to and parallel to the imaging surface of the imaging device 40. For explanation, an XYZ coordinate system is established. The exit surface of the spatial light modulator 20 and the imaging surface of the imaging device 40 may be in the XY plane, and the spatial light modulator 20 and the imaging device 40 may be separated by a distance z in the Z-axis direction. In the following description, the X-axis direction may be referred to as a first direction, and x may represent coordinate on the X-axis. The Y-axis direction may be referred to as a second direction, and y may represent coordinates on the Y-axis.

The light source device 10 may be used to emit laser to the spatial light modulator 20. Optionally, the light source device 10 may be a laser source, wherein the laser source may be a tunable laser in near-infrared spectrum, such as in a wavelength range of 1525 to 1565 nanometer.

During the use of the spatial light modulator 20, phase modulation is performed on incident light by inputting a phase diagram in the spatial light modulator 20, wherein due to light at different positions requires different modulation amplitudes, for example, different voltages can be applied on respective pixel units of the spatial light modulator 20 to perform phase modulation thereon. In the embodiments of the present disclosure, the spatial light modulator 20 may comprise a reflective spatial light modulator and a transmissive spatial light modulator. The transmissive spatial light modulator may be Liquid Crystal on Silicon (Leos). In the embodiments of the present disclosure, the spatial light modulator 20 may comprise pixel units arranged in an array. Specifically, wider active control, the spatial light modulator 20 can modulate a certain parameter of light field via liquid crystal molecules, such as modulating the phase via refractive index, modulating the polarization state via the rotation of the polarization plane, or achieving the transformation from incoherent to coherent light, so as to load certain information on light wave to achieve the purpose of light wave modulation.

Specifically, the control device 30 may apply corresponding voltages to respective pixel units of the spatial light modulator 20 based on the phase diagram of the image to be displayed, so that the spatial light modulator 20 realizes phase modulation. Optionally, the control device 30 may be a computer or the like, however there are no limitations on this in the embodiments of the present disclosure. The spatial light modulator 20 may be composed of liquid crystal material. Due to birefringence of the liquid crystal material is small and operating voltage is too high, the depth of the phase modulation generally of 2π may be directly achieved under the operating voltage of the spatial light modulator 20 (for example, 5.5 v). If the high phase depth modulation is required, the liquid crystal material with large birefringence and high dielectric constant is required. It could be noted that the high phase depth modulation is beneficial to improve diffraction efficiency of the spatial light modulator, and the greater the beam deflection angle is, the more obvious the effect of improving the diffraction efficiency is. Therefore, it is necessary to realize the high phase depth modulation through phase wrapping. The phase wrapping function is expressed by Formula 1 as below:

$$\phi'(x, y) = rem\left(\frac{\phi(x, y)}{2\pi}\right) * 2\pi + \text{floor}\left(\frac{\phi(x, y)}{2\pi}\right) * 2\pi. \quad \text{Formula 1}$$

where φ(x,y) is the phase modulation function of the spatial light modulator 20 in the range of 0 to 2π, and "rem" is remainder function, "floor" is a downward rounding function, wherein rem $$rem\left(\frac{\phi(x, y)}{2\pi}\right) * 2\pi$$

represents the phase modulation in the range of 0 to 2π; floor(φ(x,y)/2π)*2π represents the phase modulation in the rang exceeding 2π, taking 2π as a step size, and thus phase turning point occurs every time when the phase difference equals an integer multiple of 2π.

Figure 2:
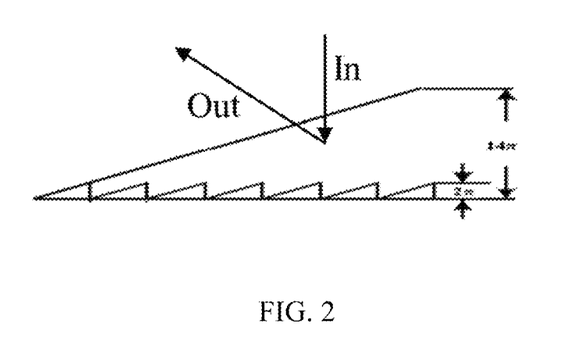
FIG. 2 shows a schematic diagram of phase wrapping that realizes 14π phase depth modulation.

In the embodiment of the present disclosure, the number of pixels required for phase wrapping is N. N may be 4, 8, 16, etc. FIG. 2 shows a schematic diagram of phase wrapping that realizes 14π phase depth modulation. As shown in FIG. 2, the phase of the exit light Out is deflected by 14π relative to incident light In. The phase modulation range of 14π equals 7 multiples of 2π, and 6 times of phase wrapping are required to realize this phase depth modulation. In the embodiments of the present disclosure, the control device 30 may be a computer, but other devices are also feasible, however there are no limitations on this herein. The spatial light modulator 20 performs phase modulation on the laser illuminated thereon to generate the diffraction, thereby forming a three-dimensional image of the image to be displayed on the imaging device 40.

In the embodiments of the present disclosure, the imaging device 40 may be used to image according to the light emitted by the spatial light modulator 20. Optionally, the imaging device 40 may comprise an image sensor, however there are no limitations on this in the embodiments of the present disclosure.

The method for analyzing the imaging quality in related art may comprise: construct a transmittance distribution function of the spatial light modulator in a frequency domain; obtaining a analysis parameter based on the transmittance distribution function; and analyzing the imaging quality based on the analysis parameter. It can be seen that the construction of the transmittance distribution function in the frequency domain is the key to obtaining the analysis parameter.

Figure 3:
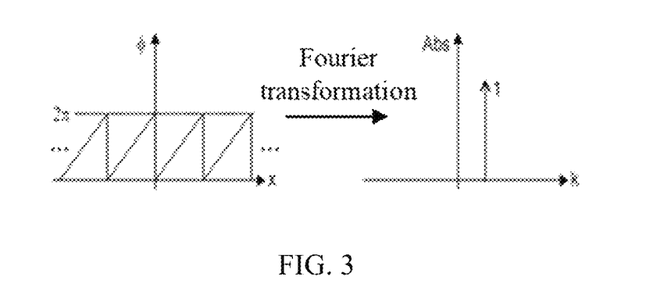
FIG. 3 shows a schematic diagram of a transmittance distribution function of a spatial light modulator in a spatial domain and a schematic diagram of the corresponding transmittance distribution function of the spatial light modulator in a frequency domain.
Figure 4:
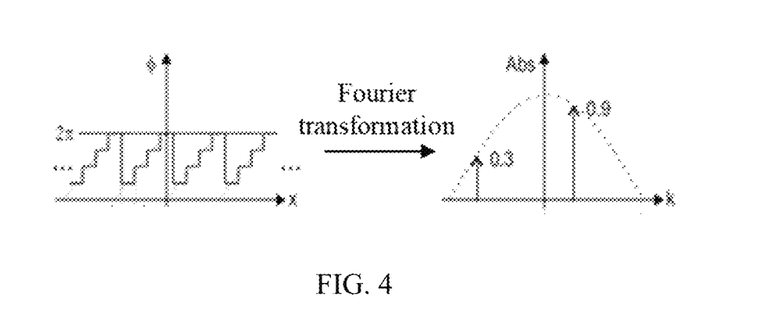
FIG. 4 shows a schematic diagram of a transmittance distribution function of another spatial light modulator in the spatial domain and a schematic diagram of the corresponding transmittance distribution function of another spatial light modulator in the frequency domain.

FIG. 3 shows a schematic diagram of the transmittance distribution function of the spatial light modulator in the spatial domain and a schematic diagram of the corresponding transmittance distribution function in the frequency domain. As shown in FIG. 3, as for the ideal spatial light modulator, N can equal infinity, and the spatial light modulator can be approximated as a blazed grating. The transmittance distribution in the frequency domain can be obtained by performing a Fourier transform on the transmittance distribution of the blazed grating in the spatial domain. In this case, there is only one pulse in the frequency domain. FIG. 4 is a schematic diagram of the transmittance distribution function of another spatial light modulator in the spatial domain and a schematic diagram of the corresponding transmittance distribution function of another spatial light modulator in the frequency domain. As shown in FIG. 4, N is 4. As for such spatial light modulator, according to the pixel structure, the spatial light modulator can be approximated as a periodic step function as shown in the drawing. The entire spectrum may shift, and secondary diffracted light may enter an envelope of the sinc function.

The method for analyzing imaging quality of the imaging system according to the embodiments of the present disclosure will be described in detail below with reference to FIGS. 5 to 16.

Figure 5:
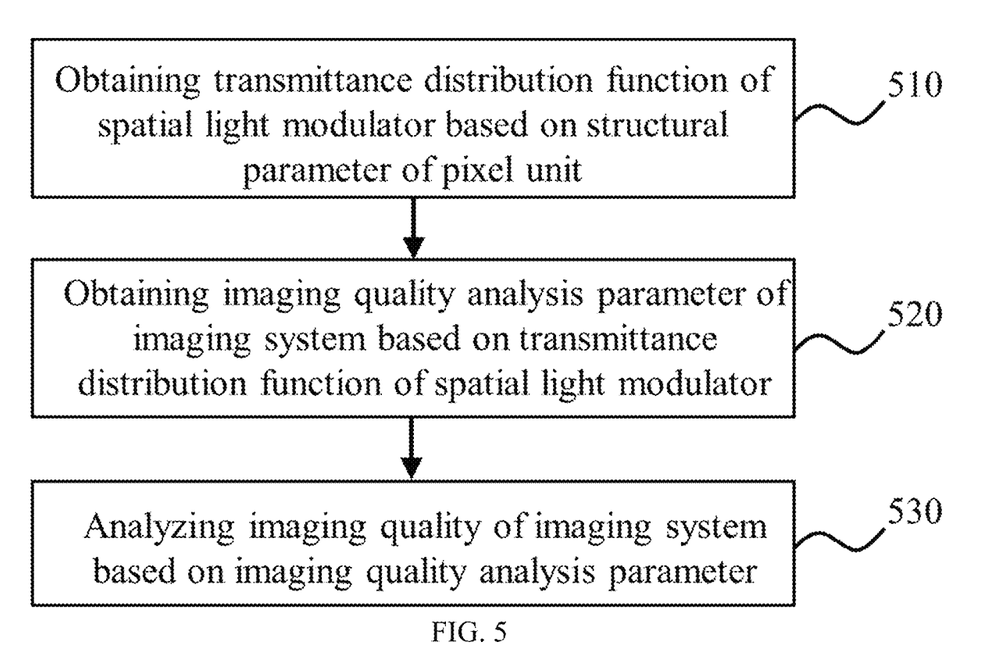
FIG. 5 shows a flowchart of a method for analyzing an imaging quality of an imaging system according to an embodiment of the present disclosure.

FIG. 5 shows a flowchart of a method for analyzing the imaging quality of the imaging system according to an embodiment of the present disclosure. At step 510, based on the structural parameter of the pixel unit, the transmittance distribution function t(x,y) of the spatial light modulator 20 may be obtained. In the embodiments of the present disclosure, the structural parameter of the pixel unit may include the aperture ratio of the pixel unit.

Figure 6A:
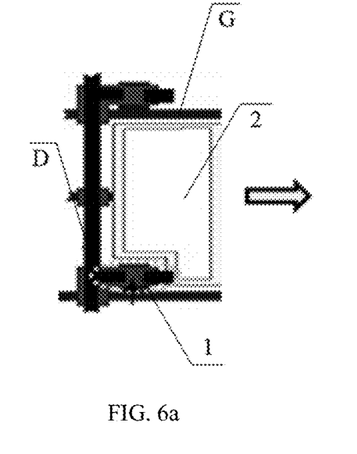
FIGS. 6a to 6c respectively show different schematic structural diagrams of a conventional pixel unit.
Figure 6B:
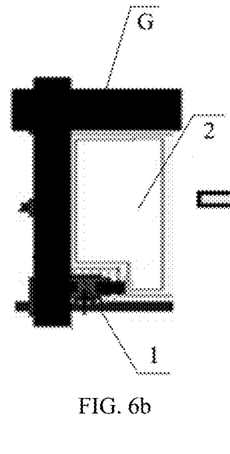
Figure 6C:
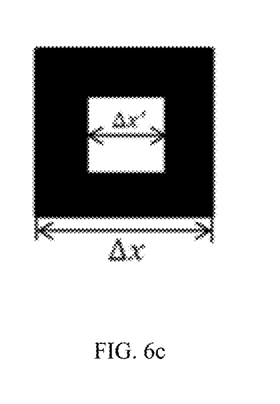

The spatial light modulator 20 may also comprise a scanning line G and a data line D. The pixel unit may be defined by the intersection of the scanning line G and the data line D. The pixel unit may comprise a thin film transistor 1 and a pixel electrode 2, wherein the pixel electrode 2 is connected to a drain electrode of the thin film transistor 1. FIG. 6b shows a schematic structural diagram of the pixel unit as shown in FIG. 6a with a mask. FIG. 6c shows an equivalent diagram of the pixel unit as shown in FIG. 6b. As shown in FIG. 6c, the equivalent diagram of the pixel unit is square, Δx' is an aperture side length of the pixel unit, and Δx is a side length of the pixel unit. Therefore, the aperture ratio K of the pixel unit can be calculated by Formula 2 below:

$$K = \left(\frac{\Delta x'}{\Delta x}\right)^2 \quad \text{Formula 2}$$

Based on the Formula 2, in the case the side length Δx of the pixel unit is given and the aperture ratio K of the pixel unit is obtained, the aperture side length Δx' of the pixel unit may be obtained.

Figure 7A:
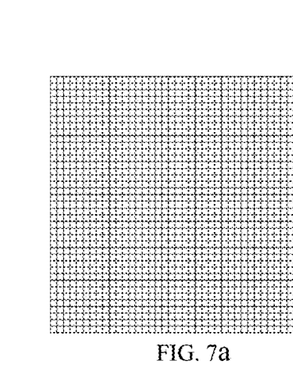
FIGS. 7a to 7b show schematic structural diagrams of a spatial light modulator with an aperture ratio of the pixel unit of 90% and 25%, respectively.
Figure 7B:
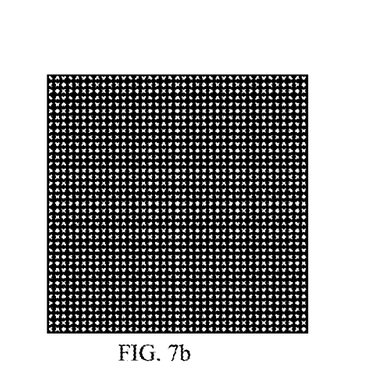

In the embodiments of the present disclosure, the aperture ratio of the pixel unit may include 90% and 25%. As for an example with the side length of the pixel unit of 10 μm. FIGS. 7a to 7b show schematic structural diagrams of a spatial light modulator 20 with aperture ratios K of the pixel unit of 90% and 25%, respectively.

Figure 8:
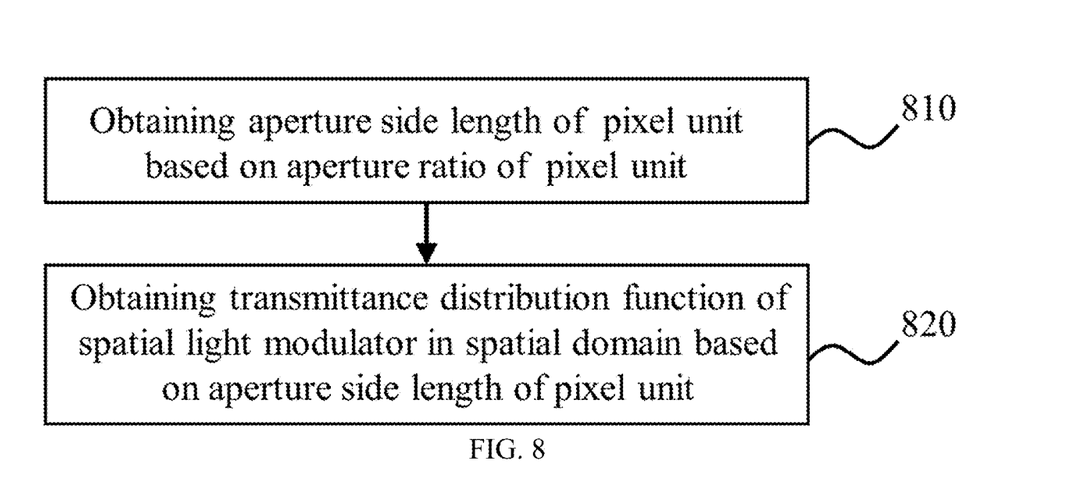
FIG. 8 shows a flowchart of a method for obtaining the transmittance distribution function of the spatial light modulator based on a structural parameter of the pixel unit according to an embodiment of the present disclosure.

Step 510 will be described below in detail with reference to FIG. 8. FIG. 8 shows a flowchart of a method for obtaining the transmittance distribution function of the spatial light modulator 20 based on the structural parameter of the pixel unit according to an embodiment of the present disclosure.

At step 810, based on the aperture ratio K of the pixel unit, the aperture side length Δx' of the pixel unit may be obtained. In the embodiments of the present disclosure, based on the aperture ratio K of the pixel unit and the side length Δx of the pixel unit, the aperture side length Δx' of the pixel unit may be obtained via the above Formula 2.

At step 820, based on the aperture side length Δx' of the pixel unit, the transmittance distribution function t(x,y) of the spatial light modulator 20 in the spatial domain may be obtained.

Figure 9:
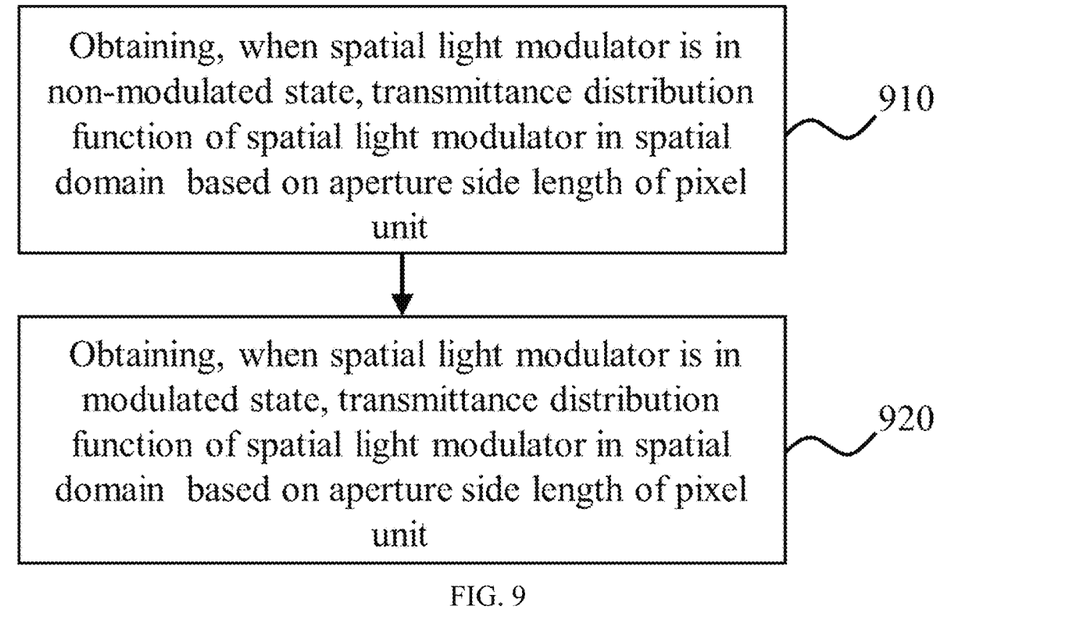
FIG. 9 shows a flowchart of a method for obtaining the transmittance distribution function of a spatial light modulator in a spatial domain based on an aperture side length of the pixel unit according to an embodiment of the present disclosure.
Figure 10:
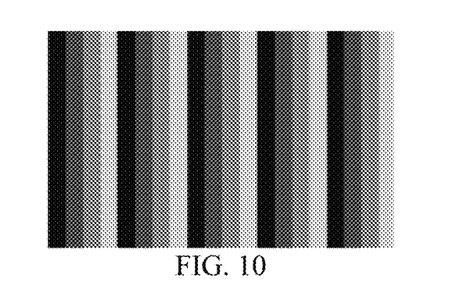
FIG. 10 is a schematic diagram of a test phase diagram according to an embodiment of the present disclosure.

Step 820 will be described below in detail with reference to FIG. 9. FIG. 9 shows a flowchart of a method for obtaining the transmittance distribution function t(x,y) of the spatial light modulator 20 in the spatial domain based on the aperture side length Δx' of the pixel unit according to an embodiment of the present disclosure. In the embodiments of the present disclosure, the spatial light modulator 20 may have a non-modulated state and a modulated state. When the control device 30 in the non-modulated state, the control device 30 may not apply a voltage to the spatial light modulator 20. When the control device 30 in the modulated state, the control device 30 may apply voltages to respective pixel units of the spatial light modulator 20 based on the phase diagram of the image to be displayed. In the embodiments of the present disclosure, the phase diagram of the image to be displayed may be a test phase diagram, for example, the test phase diagram with N of 4 as shown in FIG. 10. However, those skilled in the art could understand that N may comprise other values.

When the spatial light modulator 20 is in the non-modulated state, the spatial light modulator 20 may be equivalent to a two-dimensional grating with orthogonal contiguity. In this case, the spatial light modulator has a pure amplitude modulation grating without phase modulation.

At step 910, when the spatial light modulator 20 is in the non-modulated state, the transmittance distribution function t(x,y) of the spatial light modulator in the spatial domain may be obtained based on the aperture side length Δx' of the pixel unit.

In the embodiments of the present disclosure, the transmittance distribution function t(x,y) may be obtained via Formula 3 as below:

$$t(x, y) = \left[comb\left(\frac{x}{\Delta x}\right)comb\left(\frac{y}{\Delta x}\right)\right] * \left[rect\left(\frac{x}{\Delta x'}\right)rect\left(\frac{y}{\Delta x'}\right)\right] \quad \text{Formula 3}$$

where "comb" is a comb function, "rect" is a matrix function, and "*" is a convolution operation.

Figure 11:
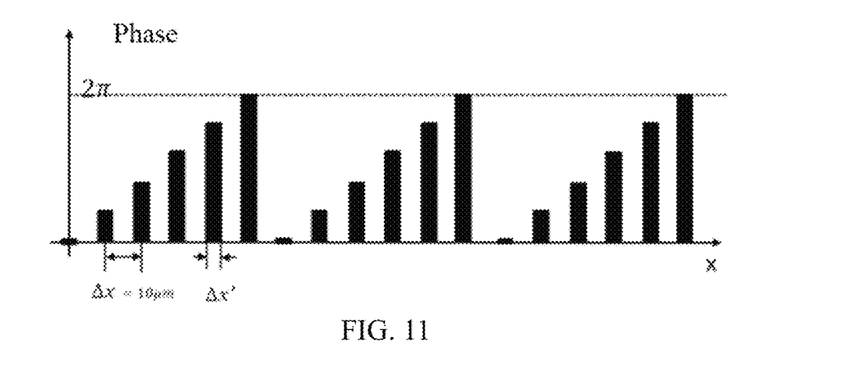
FIG. 11 shows an equivalent model of the spatial light modulator in a modulated state according to an embodiment of the present disclosure.

At step 920, when the spatial light modulator 20 is in the modulated state, the transmittance distribution function t(x, y) of the spatial light modulator in the spatial domain may be obtained based on the aperture side length Δx' of the pixel unit. FIG. 11 shows an equivalent model of the spatial light modulator 20 in the modulated state. As shown in FIG. 11, when a voltage is applied to the pixel unit, the spatial light modulator 20 is equivalent to the model shown in FIG. 11 according to the deflection effect of the pixel unit and liquid crystal molecule. In the embodiments of the present disclosure, the transmittance distribution function t(x,y) may be obtained via Formula 4 as below:

$$t(x, y) = \left[\sum_{k=0}^{N-1} rect\left(\frac{x - k\Delta x}{\Delta x'}\right) \sum_{k=0}^{N-1} rect\left(\frac{y - k\Delta x}{\Delta x'}\right) \exp\left(i\frac{2\pi k}{N-1}\right)\right] * \quad \text{Formula 4}$$

$$\left[comb\left(\frac{x}{N\Delta x'}\right)comb\left(\frac{y}{N\Delta x'}\right)\right]$$

where exp ( ) is an exponential function.

Figure 12A:
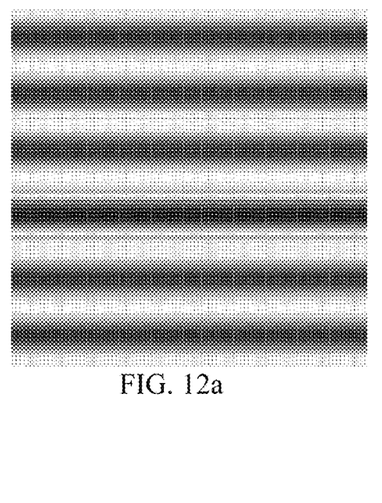
FIGS. 12a to 12b respectively show schematic diagrams of the transmittance distribution of the spatial light modulator when the spatial light modulators as shown in FIGS. 7a and 7b are in the modulated state according to an embodiment of the present disclosure.
Figure 12B:
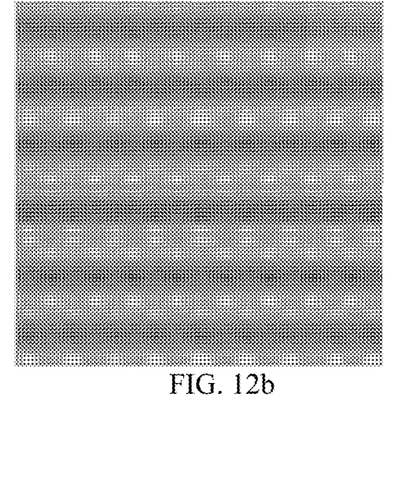

As for an example with the side length of the pixel unit of 10 μm, FIGS. 12a to 12b respectively show schematic diagrams of the transmittance distribution of the spatial light modulator when the spatial light modulator 20 as shown in FIGS. 7a and 7b are in the modulated state according to an embodiment of the present disclosure. As shown in FIGS. 12a to 12b, when the aperture ratios of respective pixel units are the same, the transmittance distributions of the spatial light modulator in different states are different.

In the embodiments of the present disclosure, N is the number of the pixel units required for the phase wrapping. In the embodiments of the present disclosure, number N of the pixel units required for the phase wrapping is also named as grayscale level. When N is infinity, the transmittance distribution function of the spatial light modulator 20 is the same as the transmittance distribution function of the spatial light modulator 20 with a high grayscale level, a high aperture ratio, and a small pixel unit pitch in the related art. That is to say, the transmittance distribution function provided by the present disclosure may be applied not only to the spatial light modulator with a greater aperture ratio, but also to the spatial light modulator 20 with a smaller aperture ratio, and applied not only to the spatial light modulator with a higher grayscale level, but also to the spatial light modulator with a lower grayscale level. Different situations may be achieved by providing corresponding value to the parameter. For example, when the aperture ratio of the spatial light modulator 20 is great, Δx=Δx' may be given. When the grayscale level of the spatial light modulator is higher and close to an ideal example, N may be infinite, and so on.

When the spatial light is in the modulated state, the method provided by the embodiments of the present disclosure constructs the transmittance distribution function of the spatial light modulator by taking the aperture ratio of the pixel unit and the phase diagram into consideration, so as to make the imaging quality analysis of the imaging system more accurate. Therefore, the method provided by the present disclosure is applicable to the imaging system comprising the spatial light modulator with the smaller aperture ratio of the pixel unit, wherein the influence of this aperture ratio cannot be ignored.

At step 520, the imaging quality analysis parameter of the imaging system may be obtained based on the transmittance distribution function of the spatial light modulator 20. Step 520 will be described below in detail with reference to FIG. 13.

Figure 13:
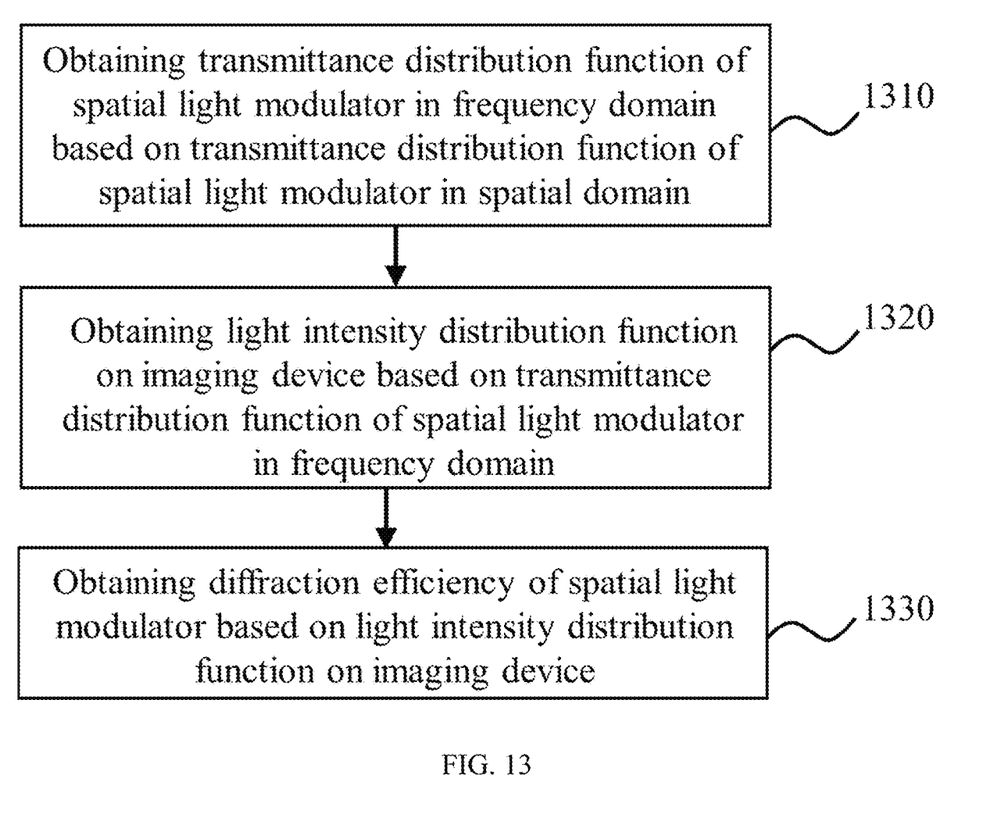
FIG. 13 shows a flowchart of a method for obtaining an imaging quality analysis parameter of the imaging system based on the transmittance distribution function of the spatial light modulator according to an embodiment of the present disclosure.

FIG. 13 shows a flowchart of a method for obtaining the imaging quality analysis parameter of the imaging system based on the transmittance distribution function of the spatial light modulator 20 according to an embodiment of the present disclosure. At step 1310, based on the transmittance distribution function t(x,y) of the spatial light modulator 20 in the spatial domain, the transmittance distribution function T(f$_x$, f$_y$) of the spatial light modulator 20 in the frequency domain may be obtained.

The Fourier transform may be performed on the transmittance distribution function t(x,y) of the spatial light modulator 20 in the spatial domain to obtain the transmittance distribution function T(f$_x$, f$_y$) of the spatial light modulator 20 in the frequency domain via Formula 5 shown as below:

$$T(f_x, f_y) = \mathit{fft}(t(x,y)) = \iint_{-\infty}^{\infty}(x,y)\exp[-j2\pi(f_x x_0 + f_y y)]dxdy \quad \text{Formula 5}$$

At step 1320, the light intensity distribution function I(x,y) on the imaging device 40 may obtained based on the transmittance distribution function T(f$_x$, f$_y$) of the spatial light modulator in the frequency domain. In the embodiments of the present disclosure, the relationship between the amplitude distribution function U(x,y) of the exit light of the spatial light modulator 20 in the spatial domain and the transmittance distribution function t(x,y) thereof in the spatial domain is U(x,y)=A t(x,y), where A is an amplitude of light emitted by the light source device 10, and λ is the wavelength of laser emitted by the light source device. In the embodiments of the present disclosure, A may be a normalized amplitude. For example, A may equal 1. In combination with the above Formula 5 based on the transmittance distribution function T(f$_x$, f$_y$) of the spatial light modulator 20 in the frequency domain, the light intensity distribution function I(x,y) on the imaging device 40 via Formula 6 as below:

$$I(x, y) = \left(\frac{A}{\lambda z}\right)^2 \left|T\left(\frac{x}{\lambda z}, \frac{y}{\lambda z}\right)\right|^2 \quad \text{Formula 6}$$

Figure 14A:
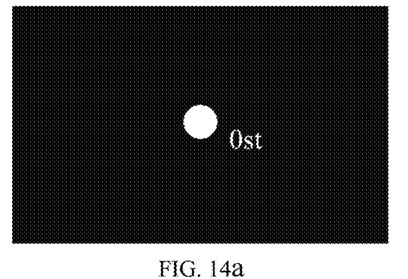
FIGS. 14a to 14b respectively show schematic diagrams of light intensity distribution on the imaging device when the spatial light modulators as shown in FIGS. 7a and 7b are in a non-modulated state according to an embodiment of the present disclosure.
Figure 14B:
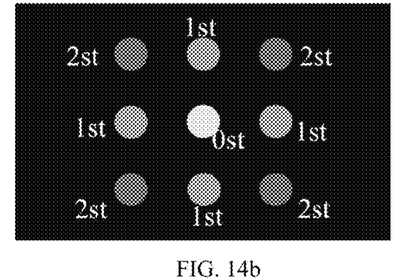

When the spatial light modulator 20 is in the non-modulated state, taking the wavelength of the light emitted by the light source device 10 being 532 nm and the light intensity thereof being a unit light intensity as an example, i.e. A=1 and λ=532 nm. FIGS. 14a to 14b respectively show schematic diagrams of light intensity distribution on the imaging device 40 when the spatial light modulators 20 as shown in FIGS. 7a and 7b are in the non-modulated state according to an embodiment of the present disclosure.

Figure 15A:
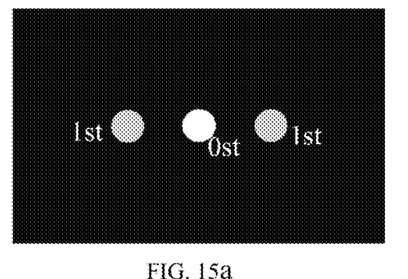
FIGS. 15a to 15b respectively show schematic diagrams of light intensity distribution on the imaging device when the spatial light modulators as shown in FIGS. 7a and 7b are in the modulated state according to an embodiment of the present disclosure.
Figure 15B:
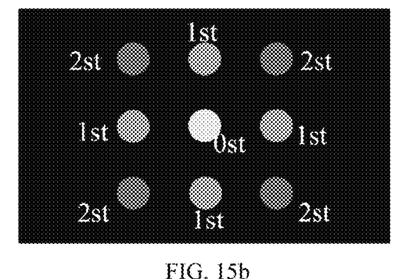

When the spatial light modulator 20 is in the modulated state, taking the wavelength of the light emitted by the light source device 10 being 532 mu and the light intensity thereof being a unit light intensity as an example, i.e. A=1 and λ=532 nm. FIGS. 15a to 15b respectively show schematic diagrams of light intensity distribution on the imaging device 40 when the spatial light modulators 20 as shown in FIGS. 7a and 7b are in the modulated state according to an embodiment of the present disclosure.

According to FIGS. 14a to 14b and FIGS. 15a to 15b, it can be concluded that: no matter whether the spatial light modulator 20 is in the non-modulated state or the modulated state, as the aperture ratio of the pixel unit on the spatial light modulator 20 decreases, the energy of diffracted light at 0th order on the imaging device 40 decreases, and the energy of the secondary diffracted light increases.

At step 1330, based on the light intensity distribution function I(x,y) on the imaging device 40, a diffraction efficiency of the spatial light modulator 20 may be obtained. Step 1330 will be described below in detail with reference to FIG. 16.

Figure 16:
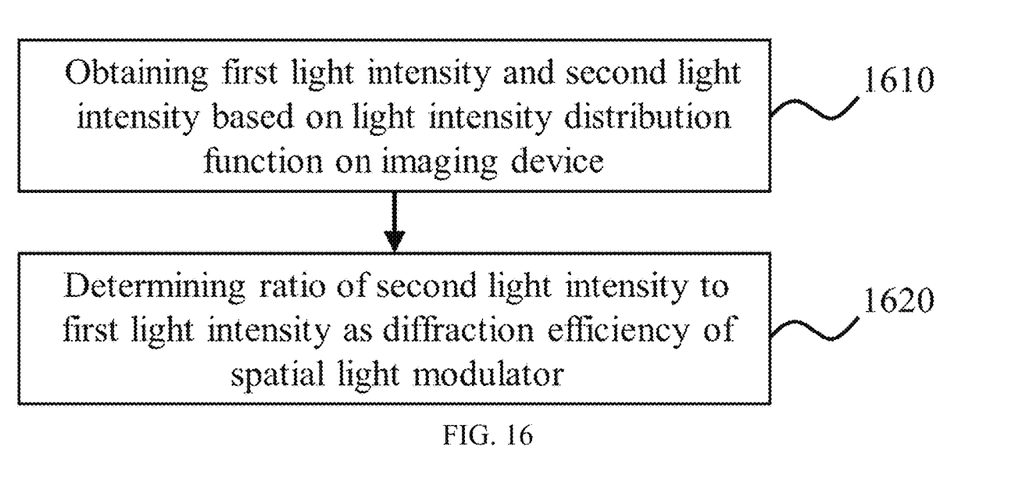
FIG. 16 shows a flowchart showing a method of obtaining a diffraction efficiency of the spatial light modulator according to the light intensity distribution function on the imaging device according to an embodiment of the present disclosure.

FIG. 16 shows a flowchart of a method of obtaining the diffraction efficiency of the spatial light modulator 20 according to the light intensity distribution function I(x,y) on the imaging device 40 according to an embodiment of the present disclosure. At step 1610, a first light intensity and a second light intensity may be obtained based on the light intensity distribution function I(x,y) on the imaging device 20. The first light intensity is a sum of light intensities at every positions of the imaging device 40 when the spatial light modulator 20 is in the non-modulated state. The second light intensity is a light intensity of the diffracted light at the desired level on the imaging device 40 when the spatial light modulator 20 is in the modulated state. In the embodiments of the present disclosure, the diffracted light at the desired level may be the diffracted light at 0th level. However, there are no limitations on this, and the diffracted light at other levels are also possible.

At step 1620, the ratio of the second light intensity to the first light intensity may be determined as the diffraction efficiency of the spatial light modulator. In the embodiments of the present disclosure, the first light intensity is considered as a total incident light intensity, rather than the diffracted light at 0th level as the total incident light intensity. Therefore, the obtained diffraction efficiency is more accurate. In the embodiments of the present disclosure, the diffracted light at the desired level is the diffracted light at 0th level. Therefore, the diffraction efficiency is the diffraction efficiency at 0th level.

At step 530, the imaging quality of the imaging system 40 may be analyzed based on the imaging quality analysis parameter. In the embodiments of the present disclosure, the quality analysis parameter is the diffraction efficiency, for example, the diffraction efficiency at 0th level. The higher the diffraction efficiency at 0th level is, the better the image quality is. In the embodiments of the present disclosure, the diffraction efficiency takes the structural parameter of the pixel unit (e.g. the aperture ratio of the pixel unit) into consideration, which can improve the accuracy of pixel quality analysis.

Figure 17:
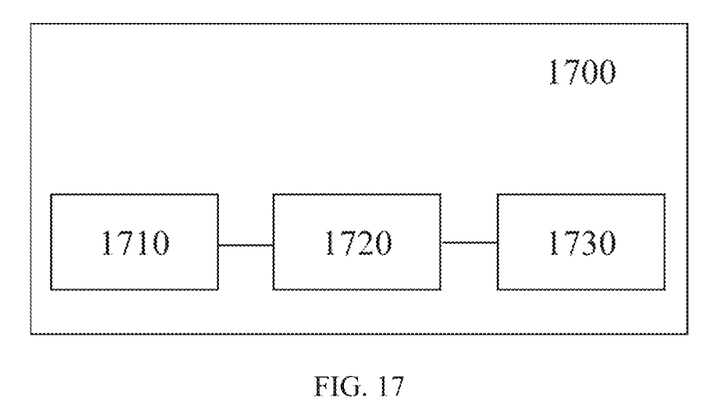
FIG. 17 shows a schematic diagram of an apparatus for analyzing the imaging quality of the imaging system according to an embodiment of the present disclosure.

Based on the same inventive concept, the present disclosure also provides an apparatus 1700 for analyzing the imaging quality of the imaging system, so as to implement the method for analyzing the imaging quality provided by the foregoing embodiments. FIG. 17 shows a schematic structural diagram of the apparatus 1700 for analyzing the imaging quality of the imaging system according to an embodiment of the present disclosure. As shown in FIG. 17, the device may comprise a transmittance distribution obtaining module 1710, a parameter obtaining module 1720 coupled to the transmittance distribution obtaining module 1710, and an analysis module 1730 coupled to the parameter obtaining module 1720.

Specifically, the transmittance distribution obtaining module 1710 is used to obtain the transmittance distribution function t(x,y) of the spatial light modulator 20 based on the structural parameter of the pixel unit, wherein the structural parameter may be the aperture ratio K. Specifically, the transmittance distribution obtaining module 1710 may obtain the aperture side length Δx' of the pixel unit based on the aperture ratio K of the pixel unit. In the embodiments of the present disclosure, the transmittance distribution obtaining module 1710 may obtain the aperture side length Δx' of the pixel unit via the above Formula 2 based on the aperture ratio K of the pixel unit and the side length Δx of the pixel unit. Then, based on the aperture side length Δx' of the pixel unit, the transmittance distribution function t(x,y) of the spatial light modulator 20 in the spatial domain may be obtained. This has been described above and will not be repeated herein. In the embodiments of the present disclosure, when the spatial light modulator 20 is in the non-modulated state and the modulated state, respectively, the transmittance distribution obtaining module 1710 may obtain the transmittance distribution function t(x,y) of the spatial light modulator 20 in the spatial domain based on the aperture side length x' of the pixel unit via the above Formula 3 and Formula 4, respectively. This has been described above and will not be repeated herein.

The parameter obtaining module 1720 is used to obtain the imaging quality analysis parameter of the imaging system based on the transmittance distribution function t(x,y) of the spatial light modulator 20. Further, the parameter obtaining module 1720 may obtain the imaging quality analysis parameter of the imaging system based on the transmittance distribution function t(x,y) of the spatial light modulator 20 by the following steps: based on the transmittance distribution function t(x,y) of the spatial light modulator 20 in the spatial domain, obtaining the transmittance distribution function $T(f_x, f_y)$ of the spatial light modulator 20 in the frequency domain. Specifically, the Fourier transform is performed on the transmittance distribution function t(x,y) of the spatial light modulator 20 in the spatial domain to obtain the transmittance distribution function $T(f_x, f_y)$ of the spatial light modulator 20 in the frequency domain. The light intensity distribution function I(x,y) on the imaging device 40 may be obtained based on the transmittance distribution function $T(f_x, f_y)$ of the spatial light modulator 20 in the frequency domain. Then, the diffraction efficiency of the spatial light modulator may be obtained based on the light intensity distribution function I(x,y) on the imaging device 40. This has been described above and will not be repeated herein. Further, the parameter obtaining module 1720 is further configured to obtain the light intensity distribution function I(x,y) on the imaging device 40 via Formula 6 based on the transmittance distribution function $T(f_x, f_y)$ of the spatial light modulator 20 in the frequency domain. Specifically, the first light intensity and the second light intensity may be obtained based on the light intensity distribution function on the imaging device 40. Then, the ratio of the second light intensity to the first light intensity may be determined as the diffraction efficiency of the spatial light modulator 20. This has been described above and will not be repeated herein.

The analysis module 1730 may analyze the imaging quality of the imaging system based on the imaging quality analysis parameter.

The imaging quality analysis apparatus provided by the embodiment of the present disclosure is used to implement the method for analyzing the imaging quality provided by the foregoing embodiments, and an implementation principle and an implementation effect thereof are similar and will not be repeated herein.

The unit, module or apparatus described herein may be implemented as a combination of a processor and a memory, wherein the processor may execute a program stored in the memory to realize the function of the corresponding unit, module or apparatus. The unit, module, or apparatus described herein can also be implemented in a complete hardware implementation, including application specific integrated circuits (ASICs), field programmable gate arrays (FPGAs), and so on.

The drawings of the embodiments of the present disclosure relate only to the structures involved in the embodiments of the present disclosure, and other structures may make reference to the general design.

Although the implementations disclosed in the present disclosure are described above, the described contents only are the implementations adopted to understand the present disclosure, and are not intended to limit the present disclosure. Any skilled in the art to which this disclosure belongs can make any modification and change to the form and detail of the implementation without departing from the spirit and the scope disclosed in the present disclosure, but the patent protection scope of the present disclosure must still be subject to the scope defined by the appended claims.

What is claimed is:

1. A method for analyzing an imaging quality of an imaging system, the imaging system comprising a spatial light modulator comprising pixel units arranged in an array, the method comprising:
   obtaining a transmittance distribution function of the spatial light modulator based on a structural parameter, which is an aperture ratio, of the pixel unit;
   obtaining an imaging quality analysis parameter of the imaging system based on the transmittance distribution function of the spatial light modulator; and
   analyzing the imaging quality of the imaging system based on the imaging quality analysis parameter.

2. The method according to claim 1, wherein the imaging quality analysis parameter comprises a diffraction efficiency of the spatial light modulator.

3. The method according to claim 2, wherein obtaining the transmittance distribution function of the spatial light modulator based on the structural parameter of the pixel unit comprises:
   obtaining an aperture side length of the pixel unit based on the aperture ratio of the pixel unit; and
   obtaining the transmittance distribution function of the spatial light modulator in a spatial domain based on the aperture side length of the pixel unit.

4. The method according to claim 3, wherein based on the aperture ratio of the pixel unit, the aperture side length of the pixel unit is obtained via a formula as below:

$$K = \left(\frac{\Delta x'}{\Delta x}\right)^2$$

where K is the aperture ratio of the pixel unit, $\Delta x$ is a side length of the pixel unit, and $\Delta x'$ is the aperture side length of the pixel unit.

5. The method according to claim 4, wherein the spatial light modulator has a non-modulated state and a modulated state,
   wherein when the spatial light modulator is in the non-modulated state, based on the aperture side length of the pixel unit, the transmittance distribution function of the spatial light modulator in the spatial domain is obtained via a formula as below:

$$t(x, y) = \left[comb\left(\frac{x}{\Delta x}\right)comb\left(\frac{y}{\Delta x}\right)\right] * \left[rect\left(\frac{x}{\Delta x'}\right)rect\left(\frac{y}{\Delta x'}\right)\right]$$

where t(x,y) is the transmittance distribution function, "comb" is a comb function, "rect" is a matrix function, "*" is a convolution operation, x is a coordinate in a first direction and y is a coordinate in a second direction perpendicular to the first direction; and
   wherein when the spatial light modulator is in the modulated state, based on the aperture side length of the pixel unit, the transmittance distribution function of the spatial light modulator in the spatial domain is obtained via a formula as below:

$$t(x, y) = \left[\sum_{k=0}^{N-1} rect\left(\frac{x-k\Delta x}{\Delta x'}\right)\sum_{k=0}^{N-1} rect\left(\frac{y-k\Delta x}{\Delta x'}\right)\exp\left(i\frac{2\pi k}{N-1}\right)\right] *$$

$$\left[comb\left(\frac{x}{N\Delta x'}\right)comb\left(\frac{y}{N\Delta x'}\right)\right]$$

where t(x,y) is the transmittance distribution function, "exp" is an exponential function, "comb" is a comb function, "rect" is a matrix function, "*" is a convolution operation, x is a coordinate in a first direction, y is a coordinate in a second direction perpendicular to the first direction, and N is a number of the pixel units required for phase wrapping.

6. The method according to claim 2, wherein the imaging system further comprises an imaging device configured to image according to diffracted light of the spatial light modulator, wherein obtaining the imaging quality analysis parameter of the imaging system based on the transmittance distribution function of the spatial light modulator comprises:
  obtaining the transmittance distribution function of the spatial light modulator in a frequency domain based on the transmittance distribution function of the spatial light modulator in the spatial domain;
  obtaining a light intensity distribution function on the imaging device based on the transmittance distribution function of the spatial light modulator in the frequency domain; and
  obtaining a diffraction efficiency of the spatial light modulator based on the light intensity distribution function on the imaging device.

7. The method according to claim 6, wherein obtaining the transmittance distribution function of the spatial light modulator in the frequency domain based on the transmittance distribution function of the spatial light modulator in the spatial domain comprises:
  obtaining the transmittance distribution function of the spatial light modulator in the frequency domain by performing a Fourier transformation on the transmittance distribution function of the spatial light modulator in the spatial domain.

8. The method according to claim 7, wherein the imaging system further comprises a light source device configured to emit laser towards the spatial light modulator, and based on the transmittance distribution function of the spatial light modulator in the frequency domain, the light intensity distribution function on the imaging device is obtained via a formula as below:

$$I(x, y) = \left(\frac{A}{\lambda z}\right)^2 \left| T\left(\frac{x}{\lambda z}, \frac{y}{\lambda z}\right) \right|^2$$

where I(x,y) is a light intensity distribution function on the imaging device, A is an amplitude of the laser, λ is a wavelength of the laser, x is a coordinate in a first direction, y is a coordinate in a second direction perpendicular to the first direction, z is a distance between the spatial light modulator and the imaging device, and $T(f_x, f_y)$ is the transmittance distribution function of the spatial light modulator in the frequency domain.

9. The method according to claim 8, wherein the spatial light modulator has a non-modulated state and a modulated state, wherein obtaining a diffraction efficiency of the spatial light modulator based on the light intensity distribution function on the imaging device comprises:
  obtaining a first light intensity and a second light intensity based on the light intensity distribution function on the imaging device, wherein the first light intensity is a sum of light intensities at every positions of the imaging device when the spatial light modulator is in the non-modulated state, and the second light intensity is a light intensity of the diffracted light at a desired level on the imaging device when the spatial light modulator is in the modulated state; and
  determining a ratio of the second light intensity to the first light intensity as the diffraction efficiency of the spatial light modulator.

10. An apparatus for analyzing an imaging quality of an imaging system, the imaging system comprising a spatial light modulator comprising pixel units arranged in an array, the apparatus comprising:
  an transmittance distribution obtaining module, configured to obtain a transmittance distribution function of the spatial light modulator based on a structural parameter, which is an aperture ratio, of the pixel unit;
  a parameter obtaining module, configured to obtain an imaging quality analysis parameter of the imaging system based on the transmittance distribution function of the spatial light modulator; and
  an analysis module, configured to analyze the imaging quality of the imaging system based on the imaging quality analysis parameter.

11. The apparatus according to claim 10, wherein the imaging quality analysis parameter comprises a diffraction efficiency of the spatial light modulator.

12. The apparatus according to claim 11, wherein the transmittance distribution obtaining module is further configured to obtain the transmittance distribution function of the spatial light modulator based on the structural parameter of the pixel unit by:
  obtaining an aperture side length of the pixel unit based on the aperture ratio of the pixel unit; and
  obtaining the transmittance distribution function of the spatial light modulator in a spatial domain based on the aperture side length of the pixel unit.

13. The apparatus according to claim 12, wherein the transmittance distribution obtaining module is further configured to obtain the aperture side length of the pixel unit based on the aperture ratio of the pixel unit and the side length of the pixel unit via a formula as below:

$$K = \left(\frac{\Delta x'}{\Delta x}\right)^2$$

where K is the aperture ratio of the pixel unit, Δx is a side length of the pixel unit, and Δx' is the aperture side length of the pixel unit.

14. The apparatus according to claim 13, wherein the spatial light modulator has a non-modulated state and a modulated state,
  wherein when the spatial light modulator is in the non-modulated state, the transmittance distribution obtaining module is further configured to obtain the transmittance distribution function of the spatial light modulator in the spatial domain based on the aperture side length of the pixel unit via a formula as below:

$$t(x, y) = \left[comb\left(\frac{x}{\Delta x}\right)comb\left(\frac{y}{\Delta x}\right)\right] * \left[rect\left(\frac{x}{\Delta x'}\right)rect\left(\frac{y}{\Delta x'}\right)\right]$$

where t(x,y) is the transmittance distribution function, "comb" is a comb function, "rect" is a matrix function, "*" is a convolution operation, x is a coordinate in a first direction and y is a coordinate in a second direction perpendicular to the first direction; and wherein when the spatial light modulator is in the modulated state, the transmittance distribution obtaining module is further configured to obtain the transmittance distribution function of the spatial light modulator in the spatial domain based on the aperture side length of the pixel unit via a formula as below:

$$t(x, y) = \left[\sum_{k=0}^{N-1} rect\left(\frac{x - k\Delta x}{\Delta x'}\right) \sum_{k=0}^{N-1} rect\left(\frac{y - k\Delta x}{\Delta x'}\right) \exp\left(i\frac{2\pi k}{N-1}\right)\right] * \left[comb\left(\frac{x}{N\Delta x'}\right) comb\left(\frac{y}{N\Delta x'}\right)\right]$$

where t(x,y) is the transmittance distribution function, "exp" is an exponential function, "comb" is a comb function, "rect" is a matrix function, "*" is a convolution operation, x is a coordinate in a first direction, y is a coordinate in a second direction perpendicular to the first direction, and N is a number of the pixel units required for phase wrapping.

15. The apparatus according to claim 11, wherein the imaging system further comprises an imaging device configured to image according to diffracted light of the spatial light modulator, wherein the parameter obtaining module is further configured to obtain the imaging quality analysis parameter of the imaging system based on the transmittance distribution function of the spatial light modulator by:
  obtaining the transmittance distribution function of the spatial light modulator in a frequency domain based on the transmittance distribution function of the spatial light modulator in the spatial domain;
  obtaining a light intensity distribution function on the imaging device based on the transmittance distribution function of the spatial light modulator in the frequency domain; and
  obtaining a diffraction efficiency of the spatial light modulator based on the light intensity distribution function on the imaging device.

16. The apparatus according to claim 15, wherein the parameter obtaining module is further configured to obtain the transmittance distribution function of the spatial light modulator in the frequency domain based on the transmittance distribution function of the spatial light modulator in the spatial domain by:
  obtaining the transmittance distribution function of the spatial light modulator in the frequency domain by performing a Fourier transformation on the transmittance distribution function of the spatial light modulator in the spatial domain.

17. The apparatus according to claim 16, wherein the imaging system further comprises a light source device configured to emit laser towards the spatial light modulator, and the parameter obtaining module is further configured to obtain a light intensity distribution function on the imaging device based on the transmittance distribution function of the spatial light modulator in the frequency domain via a formula as below:

$$I(x, y) = \left(\frac{A}{\lambda z}\right)^2 \left|T\left(\frac{x}{\lambda z}, \frac{y}{\lambda z}\right)\right|^2$$

where I(x,y) is a light intensity distribution function on the imaging device, A is an amplitude of the laser, λ is a wavelength of the laser, x is a coordinate in a first direction, y is a coordinate in a second direction perpendicular to the first direction, z is a distance between the spatial light modulator and the imaging device, and $T(f_x, f_y)$ is the transmittance distribution function of the spatial light modulator in the frequency domain.

18. The apparatus according to claim 17, wherein the spatial light modulator has a non-modulated state and a modulated state, wherein the parameter obtaining module is further configured to obtain a diffraction efficiency of the spatial light modulator based on the light intensity distribution function on the imaging device by:
  obtaining a first light intensity and a second light intensity based on the light intensity distribution function on the imaging device, wherein the first light intensity is a sum of light intensities at every positions of the imaging device when the spatial light modulator is in the non-modulated state, and the second light intensity is a light intensity of the diffracted light at a desired level on the imaging device when the spatial light modulator is in the modulated state; and
  determining an ratio of the second light intensity to the first light intensity as the diffraction efficiency of the spatial light modulator.

* * * * *

UNITED STATES PATENT AND TRADEMARK OFFICE
CERTIFICATE OF CORRECTION

| | |
|---|---|
| PATENT NO. | : 11,463,666 B2 |
| APPLICATION NO. | : 16/862877 |
| DATED | : October 4, 2022 |
| INVENTOR(S) | : Shuo Zhang et al. |

It is certified that error appears in the above-identified patent and that said Letters Patent is hereby corrected as shown below:

In the Specification

At Column 8, Line 51, please replace "Leos" with --"Lcos"--

At Column 8, Line 54, please replace "wider active control" with --"under active control"--

At Column 9, Line 26, "rem" should be deleted

In the Claims

At Column 16, In Claim 5, Line 60, please replace "(x,y)=..." with --"t(x,y)=..."--

Signed and Sealed this
Sixteenth Day of April, 2024

Katherine Kelly Vidal
*Director of the United States Patent and Trademark Office*